June 1, 1965 V. RAEBER 3,187,223
REGULATING SYSTEM CHIEFLY FOR ROTARY POWER UNITS
Filed Dec. 19, 1960
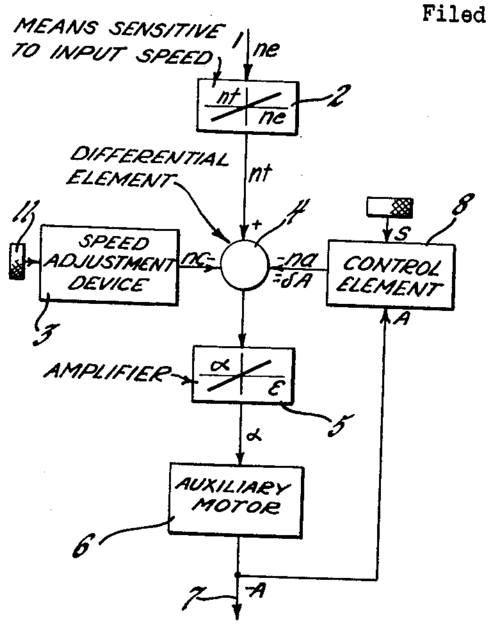
Fig. 1
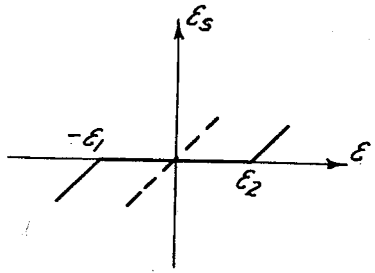
Fig. 2
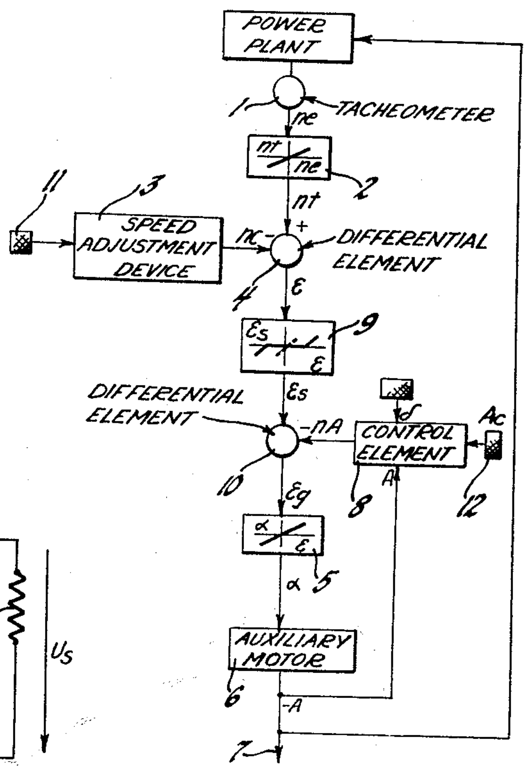
Fig. 3
D2 P2 S + Usc Up D C Uuc D1 Rs Ue O P1 Us -
Fig. 4
INVENTOR
Victor Raeber
BY Emory L. Groff Jr.
ATTORNEY United States Patent Office 3,187,223

Patented June 1, 1965

3,187,223
REGULATING SYSTEM CHIEFLY FOR ROTARY POWER UNITS

Victor Raeber, Vevey, Switzerland, assignor to Ateliers de Constructions Mecaniques de Vevey S.A., Vevey, Switzerland, a corporation of Switzerland

Filed Dec. 19, 1960, Ser. No. 76,737
4 Claims. (Cl. 317—5)

The first speed regulators, or governors, for electrically operated rotary fluid-operated power units were chiefly of a mechanical type, following which hydraulic systems were produced which allowed considerable amplifications to be performed. Finally electricity has been resorted to for regulating purposes, firstly in safety circuits and subsequently in the means provided for the drive of tachometers, which latter have remained during a long time governed by combined hydraulic and mechanical means.

Nowadays, with the development of electronic arrangements other regulators or governors, have been proposed, the measuring elements of which are of an entirely electrical type. A mechanical movement is however necessary in such cases for shifting the hydraulic slide valve which controls one or more auxiliary motors, which arrangement is the sole one known hitherto which is capable of producing with the desired accuracy, the heavy regulating operations corresponding to the actuation of the output adjusting means, such for instance as the gating or actuation of a hydraulic turbine.

At the same time, the methods for the symbolic illustration of the operation of a regulator or a governor, have been improved and allow now investigating with a greater ease and clarity its operation. This novel illustration has been resorted to in the accompanying FIG. 1 which shows diagrammatically a simplified regulating chain.

The speed regulator or governor, includes generally speaking the following elements as shown in said FIG. 1.

The input magnitude 1, the speed $n_e$

An element 2 sensitive to said magnitude and transforming it into a signal constituted by an electric instensity or voltage or by a mechanical shifting as in the case of a tachometer for instance, An element 3 which allows modifying purposely the reference value of the magnitude to tbe adjusted and which forms a change speed arrangement, or a speed adjustment device, controlled by an adjusting knob 11.

An element 4 forming the sum or the difference between the signals transmitted by the tachometer and the change speed means while incorporating if required, an auxiliary control signal, One or more amplifying elements 5 such as relays and hydraulic slide valves or electronic amplifiers, which serve for amplifying the signal received from the differential element 4 so as to provide a sufficient energy for the execution of the regulating work, An auxiliary motor 6 which produces the actual work by operating the output adjusting member such as the gating of a hydraulic turbine, An output magnitude 7 such as the value A of the gate opening of a turbine for instance, Control means 8 producing a varying action on the differential element 4 to ensure for stable conditions of operation a correspondency or relationship, between the opening A at 7, and the speed $n_e$ to be regulated.

In said FIG. 1, $n_e$ corresponds to the signal produced by the tachometer.

$n_c$ corresponds to the signal produced by the change speed means.

$\epsilon$ designates the difference between the reference value and the actual value of the speed to be adjusted, to wit, $$\epsilon=(n_t-n_c-\delta A)$$

$\alpha$ corresponds to the speed of the auxiliary motor $\delta$ designates the permanent static conditions.

A designates the gate opening of the turbine, to wit.

$$A=\delta\alpha' dt$$

The regulating chain which has just been described produces if it has been properly executed, a permanent, univocal and reciprocal correspondence between the output magnitude, that is, the gate opening A and the input magnitude, that is, the speed $n_e$. Said correspondence remains valid even for very small variations of said magnitudes.

If all the rotary power units operate in parallel and feed energy into a common network and are provided with regulators, or governors, having similar properties, said regulators, or governors, would adjust said units in parallel. The members adjusting the output of the power units would be permanently in motion so as to make the power supplied match the power consumed, which varies of course continuously.

Now, certain power units operating on networks have duties which are different from that of being subjected to speed regulation. As a matter of fact and according to the conditions of working, certain machines work with means limiting the gate opening so as to supply contractual portions of power or else, for regulating a water level in a tank or reservoir on the upstream or downstream side. Furthermore, experience shows that many operators of hydroelectric stations make their machines work with means for limiting the gate opening so as to supply constant power portions, and to prevent continuous movements of the output adjusting means which would then wear too speedily.

Whereas this modus operandi is allowable when operation is fully satisfactory, the case is no longer the same when a substantially disturbance arises in one of the interconnected networks. Assuming for instance a line conveying energy from a network X towards a network Y becomes inoperative, the network X will then produce transiently an excess power and the frequency will increase whereas the power produced in the network Y will be lower than the power consumed, so that its frequency will decrease. These opposed modifications in frequency depend on various parameters and are extremely objectionable.

My invention has for its object to cut out these drawbacks by incorporating with the chain of regulating elements an arrangement for cutting out the action of said chain and, in particular, the necessity of adjusting the means for limiting the gate opening so as to supply a constant power, whenever any small disturbances occur fortuitously in the network and the difference between the speed of the power unit and the corresponding reference speed remains lower than selected and adjusted thresholds, while allowing however the chain to take part in the regulation in the case of larger disturbances.

In the accompanying drawings, given by way of example,

FIG. 1 is as already referred to, a symbolic illustration corresponding to prior art.

FIGS. 2 to 4 relate to an embodiment of the invention and more specifically,

FIG. 2 is an explanatory diagram,

FIG. 3 illustrates symbolically, the regulating system,

FIG. 4 is a wiring diagram illustrating a preferred embodiment of the threshold element.

The regulating system according to the invention includes two elements in addition to the chain illustrated in FIG. 1, of said additional elements; the element 9, measures the disturbance and compares it with previously selected thresholds while the other element 8, 12 allows the load to be adjusted without acting on the change speed means or speed adjustment device.

The action of the first additional element 9 is illustrated in FIG. 2. As long as the difference $\epsilon$ between the reference value and the actual value of the speed ranges between $-\epsilon_1$ and $\epsilon_2$, which limit values form adjustable thresholds, the threshold element 9 transmits no order to the slide valve 5 which remains stationary. The power supplied by the turbine, assuming the regulating system is associated with a hydro-electric power unit, is constant even if small disturbances in frequency arise. Thus, the univocal and reciprocal correspondency between the output magnitude, that is, the opening of the turbine gate, and the input magnitude, that is, the speed of the turbine, is cut out or eliminated, for small differences between the reference and actual values of the speed. In contradistinction, if the disturbance is sufficient for producing a signal larger than the upper threshold selected, or lower than the lower threshold selected, the element 9 will transmit an order of movement which is a function of the difference between the disturbance and the limit value allowed.

In such a case and turning again to the preceding example of associated networks X and Y, all the machines provided with regulating systems thus improved will be subjected to regulation, which will have for its result, a considerable limitation of the consequences of a same disturbance.

The system may be executed in the manner illustrated symbolically in FIG. 3. The elements 1 to 7 are the same as in the case of FIG. 1, except for the differential means 4 which is no longer subjected to the auxiliary control element or feedback, 8. 10 designates a further differential element subjected to the control element 8; the latter is fed by a signal which is a function both of the actual value of the opening of the output adjusting member and of an adjustable reference value for said opening. The threshold element 9 is that which has been described with reference to FIG. 2 and it is inserted on the downstream side of the differential means 4. In this case, the following relationship is true $$nA=\delta(A-Ac)$$

$Ac$ corresponding to the reference value of the opening. On the other hand, $$\epsilon g=\epsilon s-nA$$

The opertaion of the arrangement is as follows: when the disturbances in the network are small, the signal $\epsilon s$ produced by the threshold element 9 is zero. The signal $$\epsilon g=-nA=\delta(A-Ac)$$

transmitted by the second differential element 10 for actuation of the slide valve 5 is a function of the difference between the actual value of the opening A and the reference value $Ac$ for the latter, which has been selected as desired, as illustrated symbolically by an adjusting knob 12; said signal $\epsilon g$ produces through the agency of the slide valve 5 and of the auxiliary motor or servomotor, 6, a modification of the opening of the output adjusting member in a direction such as will cut out the difference $A-Ac$. When the actual opening A has a value equal to that of the reference $Ac$, the signal $n_A$ is zero and the auxiliary motor, or servomotor, 6 is stationary.

To adjust the power supplied by the machine, it is therefore sufficient to act on the magnitude $Ac$, i.e., on the reference opening which may be adjusted through the knob 12.

Assuming a substantial disturbance occurs in the network and the frequency has risen above the upper selected threshold $\epsilon_2$ $$\epsilon s=\epsilon-\epsilon_2$$

The output magnitude of the threshold element 9 is positive, and it acts through the agency of the differential means 10 on the slide valve 5 which produces a closing movement of the auxiliary motor 6, which movement ceases when the signal $\epsilon g$ has returned to zero, i.e., when $$\epsilon g=\epsilon-\epsilon_2=\delta(A-Ac)=0$$

in other words $$A-Ac=\frac{\epsilon-\epsilon_2}{\delta}$$

The movement of the auxiliary motor 6 depends on the disturbance $\epsilon$ and on the static conditions $\delta$.

This adjusting or regulating, system shows the advantage of preventing the member adjusting the output of a hydraulic turbine from being always in motion while allowing however correction in the case of substantial disturbances.

In the case of a machine operating alone with a network or if the power of the machine with reference to the network as is the case for separate networks or else, if it is desired to synchronize a machine with a network; it is of advantage to cut out at least transiently the possibility afforded by the invention and to operate without the lack of sensitivity provided by the latter, this being performed in accordance with the showing of the interrupted or dotted, line drawn in FIG. 2. This modus operandi may be obtained when desired by a switch short-circuiting the additional element 9.

FIG. 4 illustrates diagrammatically an electronically operated embodiment of the additional threshold element 9 forming part of the arrangement according to FIG. 3. It has been assumed that the combination of the elements 1 and 3 of FIG. 3 produces a differential signal constituted by a D.C. voltage which is proportional to the difference between the actual value of the speed to be adjusted $n_e$ and its reference value $n_c$ transmitted by the change speed means 3. Said voltage $U_e$ will be positive whenever the actual speed $n_e$ is higher than the reference speed $n_c$ and negative in the opposite case.

In said FIG. 4, $U_p$ designates a D.C. voltage which serves for biasing two diodes $D_1$ and $D_2$. The diode $D_1$ does not feed current unless the voltage between the points D and O across said diode is negative. Similarly the diode $D_2$ feeds current only when the voltage between the points D and S across said diode is positive.

When the voltage $U_e$ constituting the abovementioned differential signal is equal to zero, no current passes through the output loading resistance $R_s$. The output voltage $U_s$ is therefore zero and no signal is transmitted to the differential element 10 (FIG. 3). If the input voltage $U_e$ increases, no current passes through the diode $D_1$, which latter for any positive value of $U_e$, is biased in the direction producing its locking. As long as $U_e$ remains lower than the voltage $U_{sc}$ biasing the diode $D_2$, the latter is also locked. When the input voltage $U_e$ rises above said biasing voltage $U_{sc}$ the diode $D_2$ becomes conductive and current flows through the output loading resistance $R_s$. The output voltage $U_s$ is then different from zero and has the same sign as the input voltage $U_e$. Its value is equal to that of $U_e$ minus the biasing voltage $U_{sc}$.

If, in contradistinction, the voltage $U_e$ is negative, the same argument may be held for the diode $D_1$, the diode $D_2$ being always biased in the direction producing its locking. The diode $D_1$ becomes conductive whenever the input voltage $U_e$ becomes smaller than the biasing voltage $U_{OC}$ of the diode $D_1$.

The output voltage $U_s$ of said threshold element 9 remains therefore equal to zero for certain small modifications of the actual speed $n_e$ with reference to the reference speed $n_c$. Said element 9 produces consequently a signal when the difference between the speed to be adjusted $n_e$ and the reference speed $n_c$ rises beyond predetermined threshold values. It should be remarked that the value of said thresholds may be adjusted by modifying the absolute value of the biasing voltage $U_p$ and of the resistances $P_1$ and $P_2$ connected with the diodes.

Obviously, FIG. 4 shows only one embodiment of a threshold element 9 and many other embodiments of such an element may be designed, the operation of which would be similar.

Furthermore, the regulating chain may include in addition to the tachometer an acceleration meter and possibly a dash-pot.

The regulating system described hereinabove is of a considerable interest in the field of hydro-electric power units. However, such regulating systems may be applied to other fields than the field of hydraulic turbines for instance to the field of thermic plants resorting to internal combustion engines, gas or steam turbines or even to the field of nuclear energy. Said adjusting system may as a matter of fact be applied to the adjustment of an atomic battery, the reference symbols referred to hereinabove as relating to the gating of a hydraulic turbine being applicable without any modification to the elements moderating the nuclear reaction which is being executed inside the reactor. The rotary power unit may include in this case a steam turbine, the atomic battery serving in this case as means for heating the steam generator.

What I claim is:

1. A speed regualting system for a rotary fluid-operated power system comprising, in combination, (1) means for producing an input signal depending on the value of the input speed, said input signal producing means being responsive to said input speed, (2) means for producing an adjustable reference signal, (3) means for forming a differential signal corresponding to the difference between said input signal formed by said input signal producing means and said adjustable reference signal, (4) means for producing an output signal depending on the value of said differential signal beyond a predetermined value, said output signal producing means being responsive to said differential signal whenever said differential signal absolute value is higher than said predetermined value, and (5) means for controlling said input speed, said input speed control means being controlled by said output signal.

2. A speed regulating system for a rotary fluid-operated power system comprising, in combination, (1) means for producing an input signal depending on the value of the input speed, said input signal producing means being responsive to said input speed, (2) means for producing an adjustable reference signal, (3) means for forming a differential signal corresponding to the difference between said input signal formed by said input signal producing means and said adjustable reference signal, (4) means for producing an output signal depending on the value of said differential signal beyond a predetermined value, said output signal producing means being responsive to said differential signal whenever said differential signal absolute value is higher than said predetermined value, (5) means for controlling said input speed, said input speed control means being controlled by said output signal, (6) adjustable means for producing an auxiliary reference signal, (7) means for producing a feedback signal, said feedback signal producing means being controlled by said means for controlling the input speed, and (8) means for acting differentially on said output producing signal means responsive to the differential signal, said means for acting differentially being controlled by the difference between the auxiliary reference signal and the feedback signal.

3. The speed regulating system of claim 1 wherein said means for producing an output signal depending on the value of the input speed is a tachometer.

4. The speed regulating system of claim 2 wherein said means for producing an output signal depending on the input speed is a tachometer.

References Cited by the Examiner

UNITED STATES PATENTS

| | | | |
|---|---|---|---|
| 2,775,724 | 12/56 | Clark | 317—5 |
| 2,829,662 | 4/58 | Carey | 317—5 X |

SAMUEL BERNSTEIN, *Primary Examiner.*